United States Patent [19]

Nir

[11] Patent Number: 4,780,882
[45] Date of Patent: Oct. 25, 1988

[54] OPTICAL RESONATOR AND LASER

[75] Inventor: Reuven Nir, Kibbutz Merhavia, Israel

[73] Assignee: Tecnir Laser Ltd., Israel

[21] Appl. No.: 140,962

[22] Filed: Jan. 5, 1988

Related U.S. Application Data

[63] Continuation of Ser. No. 857,902, Apr. 30, 1986.

[30] Foreign Application Priority Data

May 7, 1985 [IL] Israel ......................................... 75117

[51] Int. Cl.4 .................................................. H01S 3/08
[52] U.S. Cl. ......................................... 372/95; 372/99; 372/34; 372/87; 372/55; 372/51; 372/93
[58] Field of Search ............... 372/95, 99, 34, 55, 372/51, 87; 378/92, 93

[56] References Cited

U.S. PATENT DOCUMENTS

| | | | |
|---|---|---|---|
| 3,921,096 | 11/1975 | Chenausky et al. | 372/95 |
| 3,950,712 | 4/1976 | Chenausky et al. | 372/95 |
| 4,025,172 | 5/1977 | Freiberg | 372/95 |
| 4,050,036 | 9/1977 | Chambers et al. | 372/95 |
| 4,164,366 | 8/1979 | Sziklas et al. | 372/95 |

OTHER PUBLICATIONS

Sasnett, M. W., "Comparing Industrial $CO_2$ Lasers," Lasers and Applications, Sep. 1984, pp. 85-90.
Burnell, W. G., "Review of CW High-Power Laser Technology," United Aircraft Research Laboratories, East Hartford, Conn., Oct. 1973, UAR-M132.

Primary Examiner—Léon Scott, Jr.
Attorney, Agent, or Firm—Brumbaugh, Graves, Donohue & Raymond

[57] ABSTRACT

An optical resonator comprising a substantially annular reflector disposed about and generally facing a central axis and comprising at least one annular reflecting surface, a central rotationally symmetric reflector positioned along said central axis and comprising at least one central reflecting surface, and a rotationally symmetric power extraction cavity located between the annular reflector and the central reflector.

17 Claims, 6 Drawing Sheets

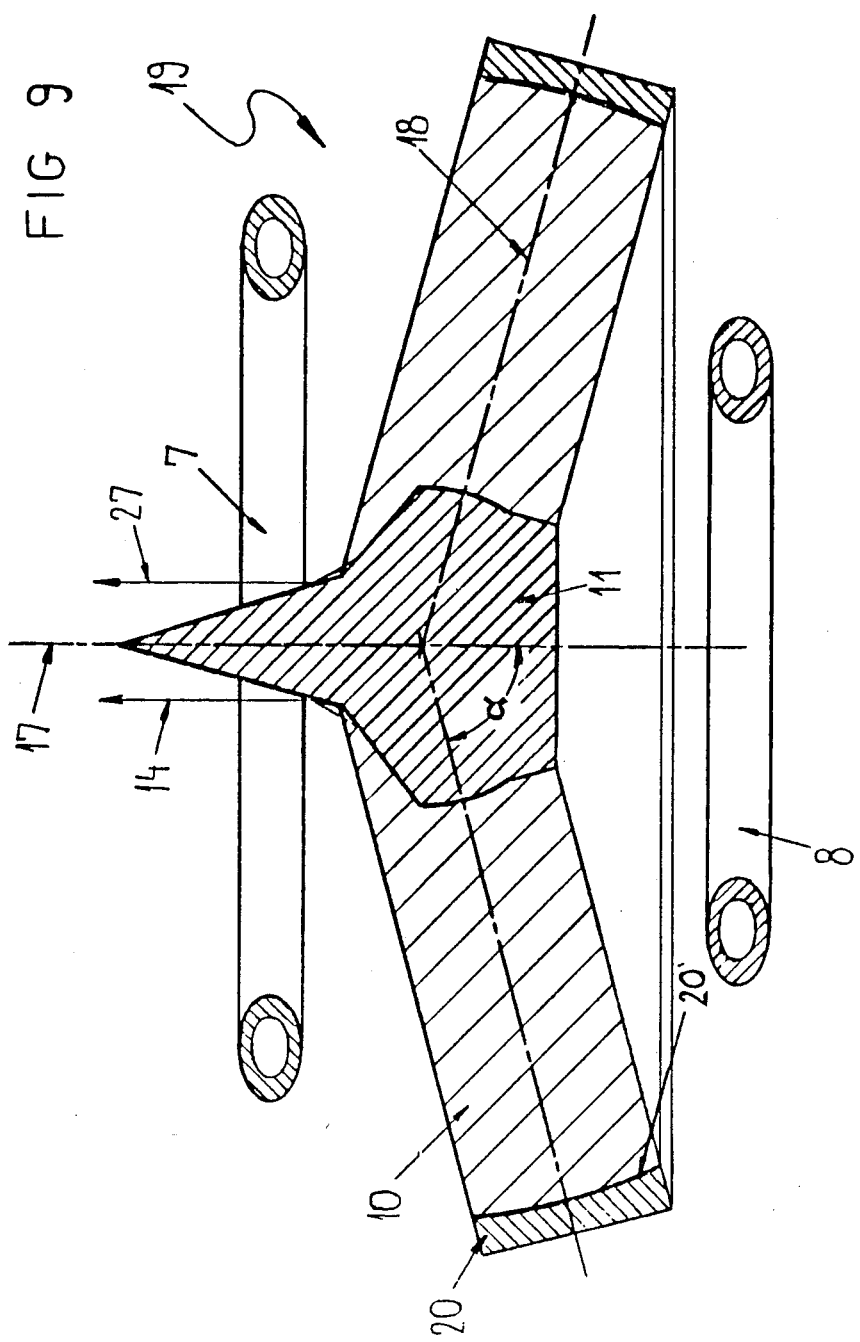

OPTICAL RESONATOR AND LASER

This application is a continuation of application Ser. No. 857,902, filed on 4-30-86.

FIELD OF THE INVENTION

The present invention relates to optical resonators and to lasers.

BACKGROUND OF THE INVENTION

All known lasers comprise the following three fundamental elements: a lasing medium which provides atoms, ions, or molecules that support light amplification, an energy source to excite the medium, and an optical resonator to provide feedback of the amplified light.

One of the most common lasing media in current use in lasers is gas. Solid state lasers are also abundant and employed in industrial application. A common source for exciting the lasing medium is an electrical discharge, though many other means for excitation are also available.

The optical resonators are of various shapes and constructions, as outlined in many publications such as those by M. W. Sasnett in "Comparing Industrial $CO_2$ Lasers" in Lasers & Applications, September 1984, pages 85-90 or by W. G. Burnell in "Review of CW High-Power Laser Technology," United Aircraft Research Laboratories - East Hartford, Conn., October 1973, UAR-M132.

The optical resonators are constructed so as to provide for a high lasing volume and a high lasing mass. Constructions most common in gas lasers are of the "coaxial" type having a long and narrow shape such as a tube having two mirrors located at both ends, two electrodes located between the mirrors, and the gas being introduced into the tube so that it flows in the direction of the laser beam produced in the resonator.

Such a construction has several disadvantages. The long distance between the mirrors make it difficult to maintain an accurate permanent relative position between the mirrors, as is essential for the accurate operation of the laser. A further disadvantage derives from the large distance between the electrodes. Because the excitation voltage is proportional to distance and pressure, a laser operating with high lasing mass must use a very high excitation voltage, thereby causing many safety and technological problems. Furthermore, the high friction rate of the gas flowing along the walls of the tube increases its temperature and its staying time in the tube, thereby decreasing its lasing capability and requiring the application of a high power gas pump.

In order to overcome these problems and to provide for more efficient lasers, lasers with other geometric constructions have been developed. Once such construction is the so called "cross flow" construction wherein the resonator is defined by two mirrors of high surface area, the electrodes being coplanar with the mirrors, and the gas being flown into the resonator perpendicular to the direction of the laser beam. Such a construction allows for a significant shortening of the time of stay of the gas in the resonator. However, because the gas is not heated homogenously along the resonator the electrical discharge will be higher at those zones where the electrical resistance is lower and the gas temperature is higher i.e., the lower lasing zones.

Another known construction is the "cross beam" type, wherein the electrical discharge and the gas flow are in the same direction and the mirrors are perpendicular thereto. In such constructions the non-homogenity in the temperature of the gas does not interfere with the electrical discharge, however, since the beam advances along non-homogenous thermal zones, excitation is predominant at the warmer zones, the least sufficient zones in respect of lasing.

An additional disadvantage of both the "cross beam" and the "cross flow" constructions is that only a very small part of the gas volume in the resonator is utilized for the production of the beam.

In all known constructions, as described above, the excitation of the lasing medium is not symmetric and therefore a non-symmetric laser beam is produced. Furthermore, the high temperature along the resonator causes non-uniformity in the beam output, thereby imparing the symmetry of the beam's cross section and mode.

The application of conical mirrors in optical resonators is known, as in U.S. Pat. No. 4,164,366 which discloses a resonator formed with optically connected cavities comprising a power extraction cavity and a mode control cavity, means for coupling the two cavities, and a conical reflective surface. The known resonator disclosed therein is a non-symmetric complex system having many components, and thus the assembly and alignment of the resonator is complicated.

European Published Patent Application No. 0100089 discloses a laser having a resonator comprising interalia substantially conical reflective surfaces for the emission of the laser beam. However, the known resonator is of a long and a non-symmetric structure, having a plurality of reflectors thereby infering a complexity in structure and operation.

U.S. Pat. No. 4,025,172 describes a compound unstable resonator comprising a pair of axially disposed rotationally symmetric mirrors and a centrally disposed conical folding mirror. The power extraction cavity is defined to have a generally cylindrical configuration and to lie intermediate the pair of rotationally symmetric mirrors.

German Offenlegungsschrift No. 24 45 597 also describes an unstable resonator. In this configuration, the power extraction cavity is not rotationally symmetric. Similarly, U.S. Pat. No. 4,164,366 shows a resonator having a rotationally symmetric fold mirror and wherein the power extraction cavities are not rotationally symmetric.

SUMMARY OF THE INVENTION

It is an object of the present invention to provide for a rotationally asymmetric resonator capable of producing, when constructed in a laser, a rotationally symmetric laser beam having a symmetric output and a low order mode.

It is further an object of the invention to provide for a resonator having a high lasing volume wherein the relative distance between the mirrors is relatively short, and whereby when the lasing medium is gas, the gas stays at the resonator for a very short period of time with only mirror interference in its flow.

It is also an object of the invention to allow for the positioning of rotational symmetrical electrodes close to each other in the resonator of the invention so that the laser can be operated at a relatively low discharge voltage.

A further object of the invention is to reduce the tendency of arcing between the electrodes by shortening considerably the staying time of the gas in the resonator.

There is thus provided in accordance with a preferred embodiment of the present invention an optical resonator comprising a substantially annular reflector disposed about and generally facing a central axis and comprising at least one annular reflecting surface, a central rotationally symmetric reflector positioned along said central axis and comprising at least one central reflecting surface, and a rotationally symmetric power extraction cavity located between the annular reflector and the central reflector.

Additionally in accordance with an embodiment of the invention, the resonator is constructed without folding mirrors between the annular reflecting surface and the central rotationally symmetric reflector.

Further in accordance with an embodiment of the invention, there is defined a locus of optical axes extending between the annular reflector and the central reflector and generally centrally of the power extraction cavity. For convenience, this locus of optical axes is hereinafter termed, "optical axis". The optical axis defines an acute angle $\alpha$ with respect to the central axis. The optical axes preferably have a radial component and have an axial component whch is either positive or negative.

It should be understood that due to the rotationally symmetrical structure of the resonator of the invention, the optical axis comprises an infinite number of optical axes extending between the annular reflector and the central reflector, forming a planar ring surface when angle $\alpha$ equals 90 degrees or a curved surface of a truncated cone when angle $\alpha$ is smaller than 90 degrees. Thus the optical axis mentioned in the specification and claims refers actually to such surfaces.

The "optical axis" represents the main direction of the beams between the annular reflector and the central reflector and it is normal to the center of an imaginary line connecting the edges of the annular reflector.

Additionally in accordance with an embodiment of the present invention, the at least one central reflecting surface comprises a conical surface.

Further in accordance with an embodiment of the present invention, apparatus is provided for connecting the annular reflector to the central reflector without interfering with optical beams passing therebetween.

Additionally in accordance with an embodiment of the present invention, the central reflector may define a conical portion having an apex. A reflector may be positioned optically facing the apex. The reflector may be a semi-transparent mirror or alternatively an element which is otherwise operative to reflect part of the radiation incident thereon and to transmit the remainder. An example of such an element is an apertured metallic mirror.

The resonator of the invention can operate as a stable resonator or as an unstable resonator. When the resonator operates as a stable resonator, the reflector is necessary for the emission of the laser beam out of the resonator and as an output coupler. When the resonator operates as an unstable resonator, the reflector may not be necessary.

A primary feature of the present invention is the rotational symmetry of the components comprising the resonator. The rotationally symmetric central reflector is one of the components of the resonator contributing to the emission of a rotationally symmetrical laser beam having a high power density and a small diameter, with mainly gaussian distribution.

The application of conical reflectors for the emission of a laser beam from a resonator is known to be problematic due to partial absorption of the incident light causing massive heating of the cone. Absorption of light is lower when the incident ray hits the reflective surface at a small angle with respect thereto. Therefore, in accordance with the present invention, the central reflector has been advantageously configured to define a narrow cone, i.e., a cone with a large height to base diameter ratio for minimal absorption of light and minimal heating of the central reflector. A narrow cone having large surface area can also be more effectively cooled than a broad short cone with small surface area.

The applicant has found that a significant increase in the reflective area of the central axially symmetrical reflector can be obtained if it is configured so that the narrow cone lies on top of a much wider truncated cone. When the resonator operates as a stable resonator it is preferable that the central reflector comprise a cone positioned on two truncated cones. When the resonator operates as an unstable resonator it is preferable that at least one segment of the central reflector have a curved surface area.

Angle $\alpha$, the angle between the optical axis and the central rotational axis of the resonator, is in the range of 10–90 degrees. The substantially annular reflector is of an exact ring structure when angle $\alpha$ is equal to 90 degrees. However, it is preferable to recline the annular reflective surface so that angle $\alpha$ is different from 90 degrees in order to prevent an amplification of those rays traveling between the reflective surface of the annular reflector without hitting the central reflector. Such rays, if formed, would impair the intensity of the laser beam emitted from the resonator. Thus, when the substantially annular reflector is reclined, only those rays traveling in the direction of the "optical axis" of the resonator will be amplified. Preferably angle $\alpha$ is in the range of 85 to 60 degrees.

The position of the central reflector relative to the substantially annular reflector is chosen so that the "optical axis" lies between the center of the annular reflector and the central reflector and is determined by angle $\alpha$.

There is also provided in accordance with an embodiment of the invention laser apparatus employing the resonator of the invention. The laser apparatus may comprise a laser or a laser amplifier.

Preferably, the laser apparatus of the invention is a gas laser such as a carbon dioxide laser, wherein a mixture of carbon dioxide, nitrogen, and helium comprises the lasing medium. However, the laser can also be adapted to other gases such as a mixture of helium and neon or argon or others, to media produced by a chemical reaction in the so-called "chemical laser", to solid media such as Nd-YAG, ruby, glass, and others, or to liquid media.

The excitation of the lasing medium can be carried out by any of the known methods, such as by electrical discharge (AC, DC or radio frequency), optical pumping, chemical reaction, or any combination of those techniques.

When the lasing medium is a solid material, the excitation is preferably carried out by optical pumping such as by a flash lamp. When the lasing medium is gas, the excitation is preferably carried out by means of electrical discharge.

Preferably, the electrodes to be used with the resonator are made of metal and shaped in a compact form, such as a dense net, a perforated metal sheet, or a honeycomb, in order to achieve the highest possible rate of excitation without blocking the gas flow through the electrodes. Alternatively, the electrodes can be made of carbon fibers in a "brush like" configuration, achieving high electrical concentration per unit area due to the very low thickness of the fibers.

The electrodes are positioned in the laser in such a way that their active surfaces lie parallel to the optical axis at both sides of the beam so that they do not interfere with the optical path of the rays.

BRIEF DESCRIPTION OF THE DRAWINGS

The present invention will be understood and appreciated more fully from the following detailed description taken in conjunction with the drawings in which:

FIG. 9 is a schematic cross sectional view of a solid state laser resonator.

DETAILED DESCRIPTION OF PREFERRED EMBODIMENTS

Figure 1:
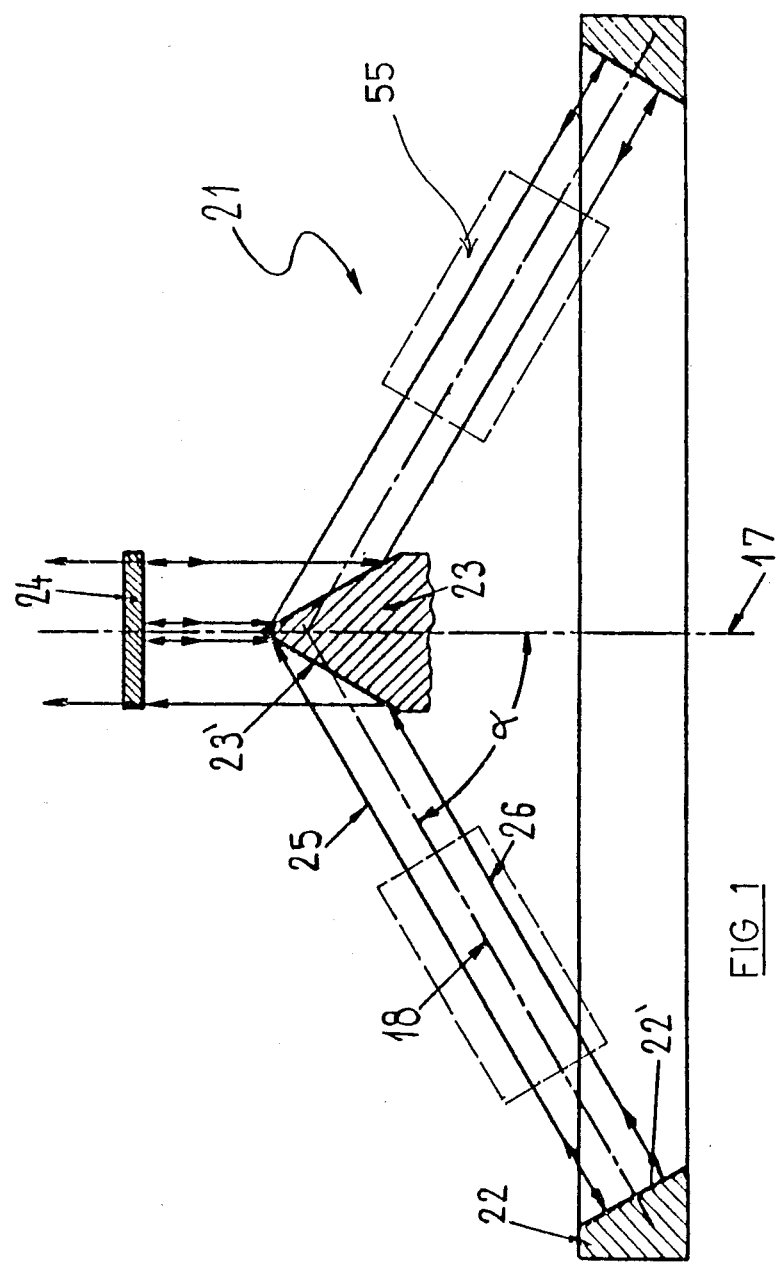
FIG. 1 is a schematic cross sectional view of a resonator in accordance with a preferred embodiment of the present invention.

FIG. 1 illustrates the basic structural relationships of the resonator according to the invention showing the rotational symmetry of a stable optical resonator 21 with a laser beam defined by extreme rays 25 and 26 which is capable of being formed in the resonator.

The resonator is defined by annular reflector 22, having a flat or curved reflective surface 22', a central reflector 23 of conical structure having a flat or curved reflective surface 23' and a semi-transparent flat or curved reflector 24 operating as an output coupler. Reflector 24 alternatively may be any other suitable type of reflector. The relative position of the reflectors is such that central reflector 23 is positioned along the central axis 17 of the resonator, and semi-transparent reflector 24 and annular reflector 22 are concentric to the central axis 17. The semi-transparent reflector 24 faces the apex of the cone of reflector 23. An optical axis 18 is perpendicular to reflective surface 22' and forms an angle α with central axis 17.

The beam reflected between reflectors 23 and 22, which is partially emitted from the system through the semi-transparent reflector 24, has a circular cross section.

The power extraction cavity is indicated on FIG. 1 and on all of the other Figures in dashed lines and identified by reference numeral 55. It is seen that the power extraction cavity has a rotationally symmetric configuration about central axis 17.

Figure 2:
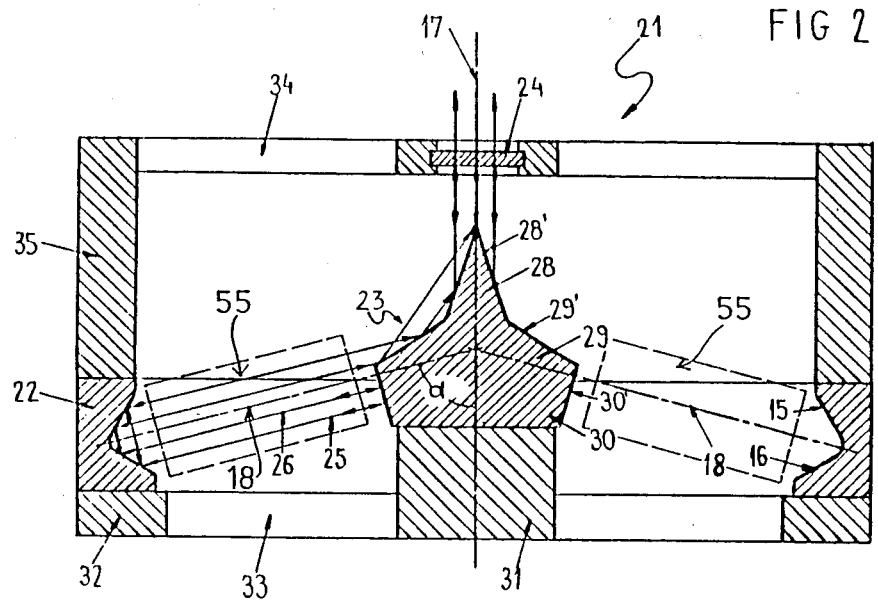
FIG. 2 is a cross sectional view of a resonator in accordance with a preferred embodiment of the present invention.

FIG. 2 shows a preferred embodiment of a stable resonator 21 in accordance with the invention in which the annular reflector 22 has two reflecting surfaces 15 and 16. Central reflector 23 has the shape of a narrow cone 28, its base being positioned on the top of a wider truncated cone 29, while the base of cone 29 is attached to another truncated cone 30. The diameters of the base of cone 29 and the top of cone 30 are the same, as are the diameters of the base of cone 28 and the top of cone 29. The reflective surfaces of central reflector 23 are surfaces 28', 29', and 30' respectively.

Central reflector 23 is attached to a cylindrical structure 31 and annular reflector 22 is attached to hollow cylinders 32 and 35 which form the outer body of the resonator. Ribs 33 connect cylindrical structure 31 and cylinder 32. Ribs 34 connect the semi-transparent reflector 24 and cylinder 35.

A collimated beam defined by extreme rays 25 and 26 reflected between surface 30' of central reflector 23 and surface 16 of annular reflector 22 moves to surface 15. The radiation further advances to surface 29', where it is reflected to surface 28' and then to the semi-transparent reflector 24, where part of the radiation emerges from the resonator and the other part is reflected backward and than forward again between the reflecting surfaces mentioned above. The beam emerging from the reflective surface of cone 28 has a circular cross section with relatively low diameter due to the small apex angle of cone 28, thereby a high intensity laser beam is produced by resonator 21. Also shown in FIG. 2 are central axis 17, optical axis 18, and angle α.

Figure 3:
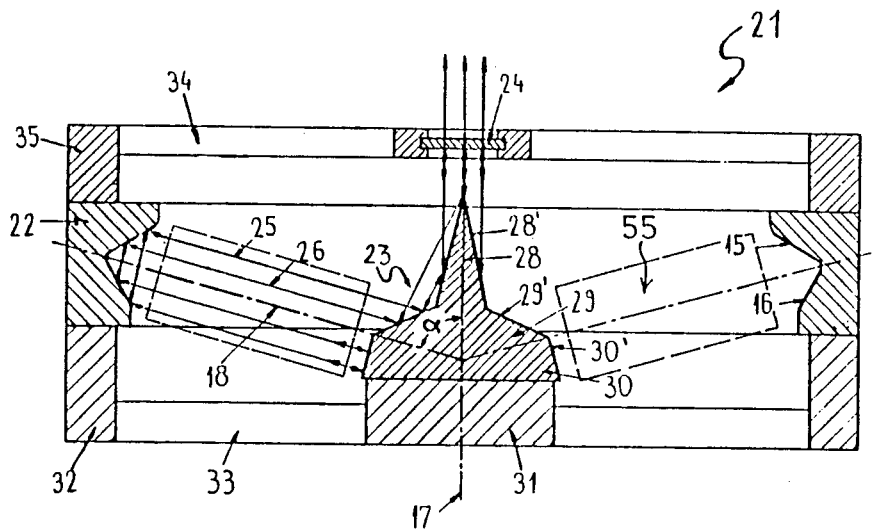
FIG. 3 is another embodiment of the resonator in accordance with a preferred embodiment of the present invention.

FIG. 3 shows another embodiment of a stable resonator similar to the embodiment of FIG. 2, in which the relative positions of annular reflector 22, central reflector 23, and semi-transparent reflector 24 are different from those shown in FIG. 2. The resonator shown in FIG. 3 can be used when it is important to minimize the size of the resonator.

Figure 4:
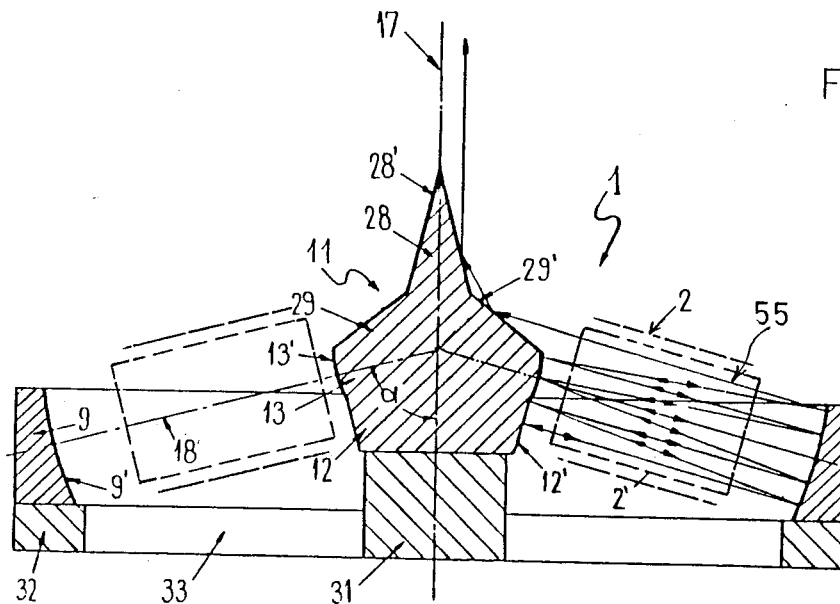
FIG. 4 is a cross sectional view of another embodiment of the resonator in accordance with a preferred embodiment of the present invention.

FIG. 4 shows a resonator 1 defined by a substantially annular concave mirror 9 having reflective surface 9', and a central mirror 11 located along the central axis 17 of the resonator. A hollow cylinder 32 serves as a base to mirror 9 and is attached by several ribs 33 to cylindrical structure 31 which serves as a holder to mirror 11 and together with ribs 33 cause mirrors 9 and 11 to form a concentric structure.

Optical axis 18 is normal to annular mirror 9 and forms an acute angle α with the central axis 17. Opposite mirror 9 there is situated a segment 13 of mirror 11. The reflective surface area 13' of segment 13 has an annular convex shape having the same "optical axis" 18. Segment 13 is positioned on segment 12 of central mirror 11. The reflective surface 12' of segment 12 has a curved surface of a truncated cone perpendicular to the optical axis 18. On top of segment 13 are situated cone segments 29 and 28. Segment 29 has the shape of a truncated cone, with reflective surface 29' and segment 28 has the shape of a full narrow cone, with reflective surface 28'.

Also shown in FIG. 4 are electrodes 2 and 2' to be used in laser apparatus operating with resonator 1. For the sake of clarity, the entire cross sectional view of the electrodes is not shown, but only the location of their schematic cross section.

Mirrors 9 and 13 are confocal, therefor resonator 1 is a confocal unstable resonator. The resonator has a large geometric magnification to provide for mode discrimination against higher order radial and azimuthal modes such that the lowest loss mode, typically the lowest order fundamental mode, is strongly favored. The resonator is a converging - diverging optical system capable of expanding and compressing electromagnetic radiation circulating therein by repeated reflections between mirrors 9 and 13. In operation, the radiation within the resonator is compressed towards "optical axis" 18 by multiple reflections between the concave and convex surfaces of the mirrors into a diffraction dominated portion concentrated around optical axis 18 of the resonator. Eventually, diffractive spreading causes the compressed inwardly propagating radiation to expand, which transforms the compressed radiation into outwardly propagation radiation, having a lowest loss mode, which fills the entire surface area of mirror 13. The radiation further expands to mirror 9 where it is reflected to mirror 29 and then to mirror 28 and leaves mirror 28 as a collimated beam of radiation having a circular compacted cross section. Part of the beam reflects from mirror 9 to mirror 12 and repeats the same track until it also emerges from mirror 28 and out of the resonator.

Amplification also takes place between mirror 9 and 11 because electrodes 2 and 2' supply energy for excitation of the lasing medium in the volume between the mirror and the electrodes. The power extraction cavity is located in the volume defined by reference numeral 55.

Figure 5:
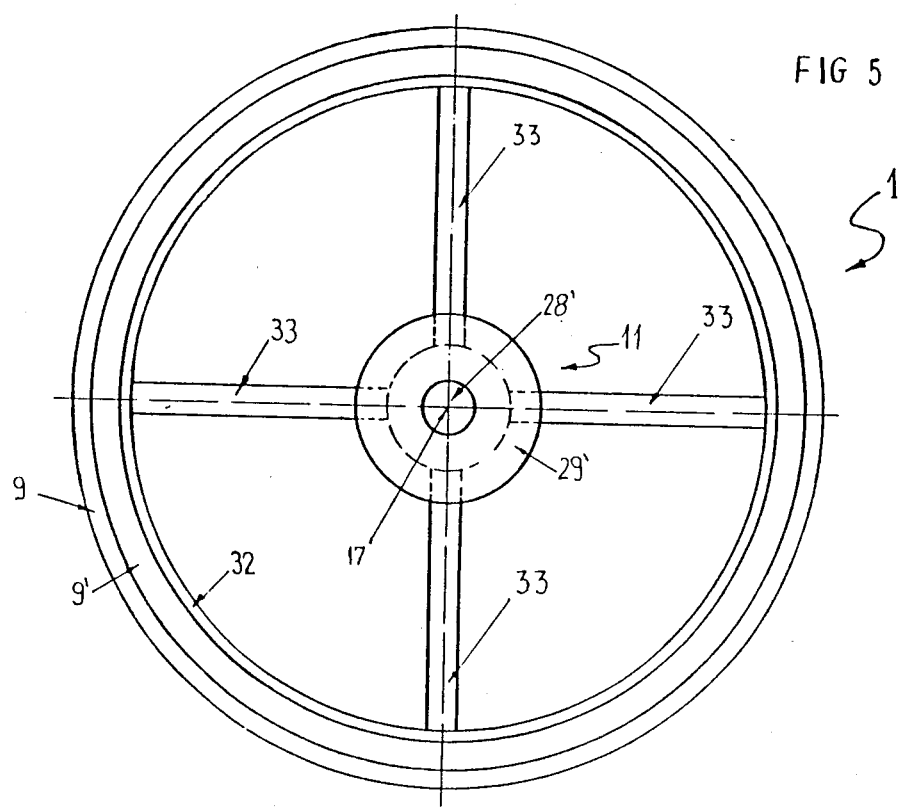
FIG. 5 is a top view of the resonator of FIG. 4.

FIG. 5 shows a top view of the resonator 1 of FIG. 4. Ribs 33 attach central mirror 11 to cylinder 32 on which the concave mirror 9 with reflective surface 9' is situated.

Figure 6:
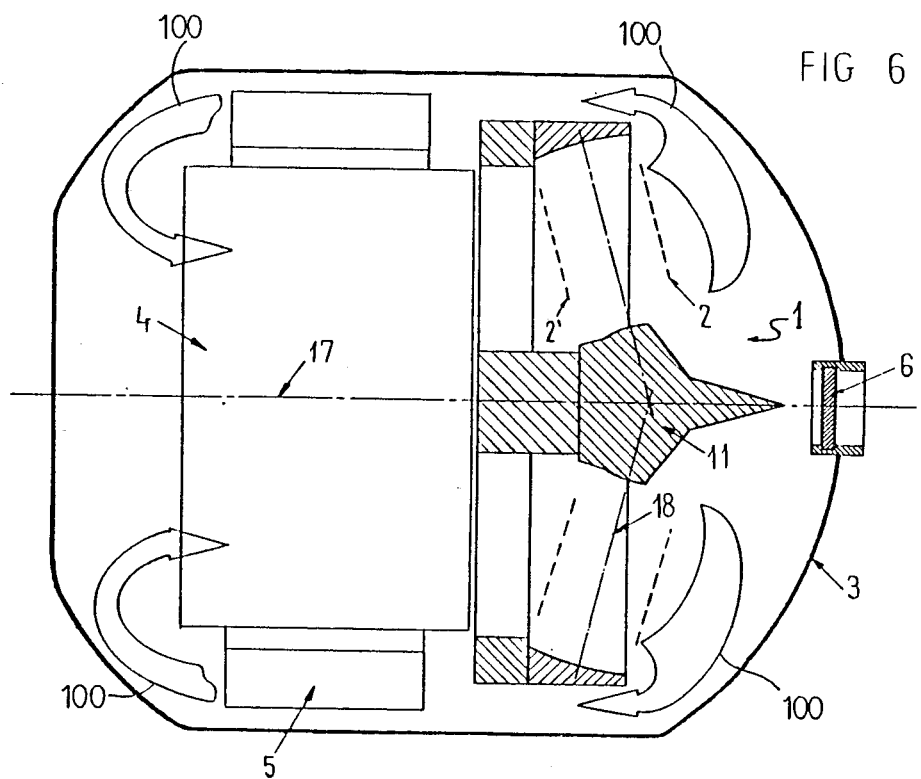
FIG. 6 is a schematic cross section view of the gas laser according to a preferred embodiment of the present invention.

FIG. 6 shows a schematic cross section of a gas laser in accordance with the present invention comprising resonator 1, and two concentric electrodes 2 and 2' parallel to optical axis 18, all placed in enclosure 3. Enclosure 3 is of substantially cylindrical shape, its central axis being the central axis 17 of the resonator.

At one end of enclosure 3, a window 6 is provided to allow the laser beam to emerge from the upper segment of mirror 11. A blower 4 is provided for the circulation of the laser gas into and out of the resonator. Blower 4 is placed along central axis 17. Several heat exchange units fill most of the rest of the volume of the enclosure. In the figure, only one annular heat exchange unit 5 is shown. The exact location of the heat exchange units is not important. Preferably, the heat exchange units are comprised of thin metal tubings (not shown in FIG. 6) having high heat conduction; cooling liquid is circulated in the metal tubing to allow for cooling of the laser gas. The lasing gas in FIG. 6 is circulated by blower 4 which causes the gas to pass through electrode 2', resonator 1, electrode 2, heat exchange unit 5 and back to blower 4. The gas flow is indicated by arrows 100.

Figure 7:
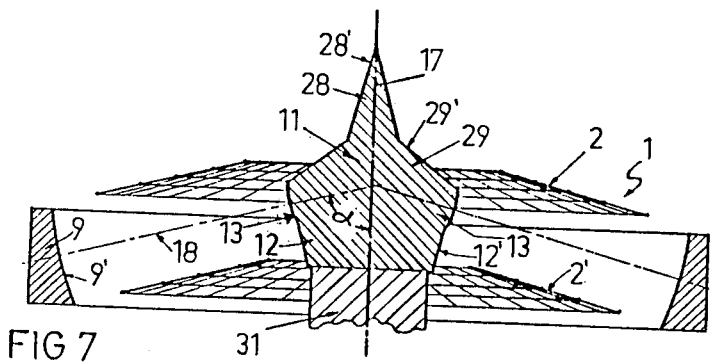
FIG. 7 is a cross sectional view of the electrodes according to a preferred embodiment of the present invention, and their relative position in the resonator of FIG. 4.

FIG. 7 shows a cross sectional view of electrodes 2 and 2' when positioned in resonator 1. Electrodes 2 and 2' each have the shape of a curved surface of a truncated cone and they are concentrically located in mutually spaced relationship about central axis 17.

Electrode 2 is located above the optical path of the rays reflected between concave mirror 9 and central mirror 11, while electrode 2' is located below the optical path. Electrodes 2 and 2' are parallel to the optical path of the beam.

Figure 8:
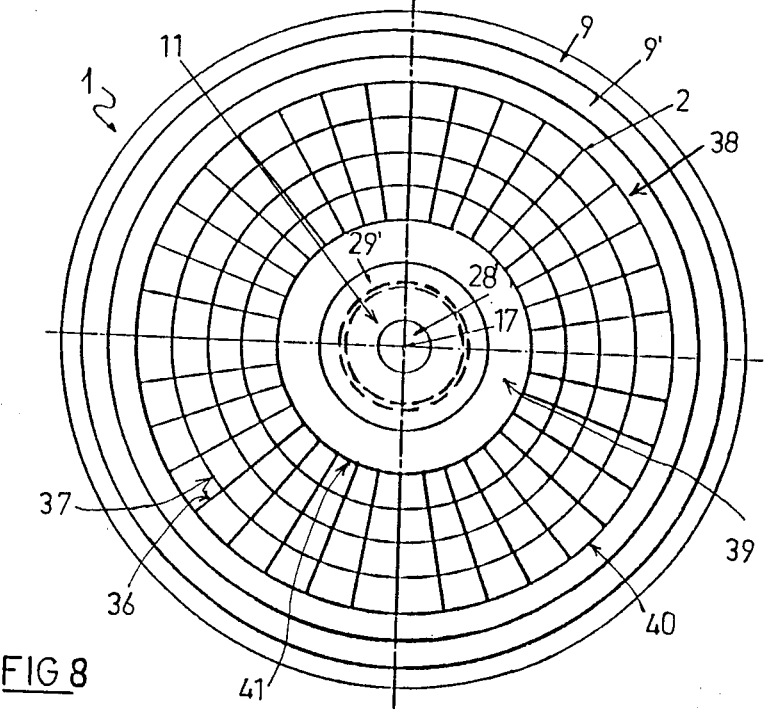
FIG. 8 is a top view of the electrode in the resonator.

FIG. 8 is a top view of FIG. 7, showing, for the sake of clarity, only the top electrode 2 having a net structure composed of radial metal wires 36 and concentric metal wires 37. There is a space 38 between the bottom edge 40 of the electrode and mirror 9 and a space 39 between the inner upper edge 41 of the electrode and mirror 11. Those spaces are necessary in order to prevent arcing between the electrodes and the metal surface of the mirrors.

FIG. 9 is a schematic cross sectional view of a solid state laser in accordance with the present invention comprising resonator 19, in which an annular mirror 20 having reflective surface 20' and central mirror 11 are positioned so that optical axis 18 forms angle $\alpha$ with the central axis 17. Mirror 11 has the same configuration as mirror 11 in FIG. 4. The lasing medium 10 is of solid material such as Nd-Yag, and it fills the volume between mirror 20 and mirror 11.

The optical path of rays in the resonator is identical to the optical path of rays in FIG. 4 and the beam emerging from resonator 19, defined by extreme rays 14 and 27, has a circular cross section. Also shown schematically in FIG. 9 are two annular flash lamps 7 and 8, used for the optical pumping of the lasing medium 10. The flash lamps are located out of the optical path of the beam.

A solid state laser may employ a stable resonator, as described in FIGS. 1, 2, and 3 or an unstable resonator as described in FIGS. 4 and 9.

It will be appreciated by persons skilled in the art that the present invention is not limited by what has been particularly shown and described hereinabove. Rather the scope of the present invention is defined only by the claims which follow.

I claim:

1. An unstable optical resonator comprising:
   a substantially annular reflector disposed about and generally facing a central axis and comprising at least one annular reflecting surface;
   a central rotationally symmetric reflector positioned symmetrically along said central axis and comprising at least one truncated cone central reflecting surface; and
   a rotationally symmetric power extraction cavity located at least partially between the annular reflector and the central reflector;
   wherein there is defined a locus of optical axes having a radial component extending between the annular reflector and the central reflector centrally of the power extraction cavity, said locus of optical axes defining a curved surface of a truncated cone and wherein said annular reflector and said central reflector are each shaped such that a resonator is defined therebetween; and
   wherein substantially all of the reflection of amplified light in said resonator is from the respective surfaces of said annular reflector and said central reflector.

2. A unstable resonator according to claim 1 wherein a portion of the light in said resonator is reflected out of said resonator by said central reflector as laser output.

3. A resonator according to claim 1 also comprising apparatus for connecting the annular reflector to the central reflector without interfering with optical beams passing therebetween.

4. A resonator according to claim 1 wherein said central reflector is configured to define a conical surface having an apex.

5. An optical resonator according to claim 1 wherein the substantially annular reflector is concavely curved and at least one central reflective surface has a convexally curved surface area.

6. A resonator according to claim 1 wherein said central reflector comprises a cone positioned on two truncated cones.

7. An optical resonator according to claim 1 wherein the angle between the central axis and the locus of optical axes lies in the range of 10 degrees to less than 90 degrees.

8. An optical resonator according to claim 1 wherein the angle between the central axis and the locus of optical axes lies in the range of 60 degrees to 85 degrees.

9. An unstable optical resonator according to claim 1 operating in a gas laser.

10. An unstable optical resonator according to claim 1 operating in a liquid laser.

11. An unstable optical resonator according to claim 1 operating in a solid laser.

12. A gas laser apparatus including:
an unstable resonator including
a substantially annular reflector disposed about and generally facing a central axis and comprising at least one annular reflecting surface;
a central rotationally symmetric reflector positioned symmetrically along said central axis and comprising at least one truncated cone central reflecting surface;
said annular reflector and said central reflector being shaped such that said resonator is defined therebetween; and
wherein substantially all of the reflection of amplified light in said resonator is from the respective surfaces of said annular reflector and said centeral reflector;
a rotationally symmetric power extraction cavity located at least partially between the annular reflector and the central reflector said cavity including a laser gas and parallel electrodes, said electrodes being concentric to the central axis of the resonator, and positioned between the central reflector and the annular reflector outside of the beam path and parallel to the locus of optical axes;
an enclosure having a window optically opposite the apex of the cone of said central reflector;
means for introducing laser gas into the resonator in a flow direction generally parallel to the central axis of the resonator; and
means for cooling the gas in the enclosure.

13. Laser apparatus according to claim 12 wherein said electrodes are made of a perforated metal sheet and have a net or honeycomb structure and the gas flowing into and out of the resonator passes through the electrodes.

14. Laser apparatus according to claim 12 wherein the electrodes are made of a carbon fiber structure.

15. Laser apparatus according to claim 12 including means for excitation selected from the following excitation means: D.C., A.C., R.F., or any combination thereof.

16. Laser apparatus according to claim 12 wherein the means for cooling the gas laser comprise heat exchange units positioned in the enclosure of the laser.

17. Laser apparatus according to claim 12 comprising a gas blower positioned in the enclosure substantially along the central axis of the resonator and circulating the laser gas into and out of the resonator in a flow generally parallel to the central axis of the resonator.

* * * * *

UNITED STATES PATENT AND TRADEMARK OFFICE
CERTIFICATE OF CORRECTION

PATENT NO. : 4,780,882
DATED : October 25, 1988
INVENTOR(S) : Reuven Nir

It is certified that error appears in the above-identified patent and that said Letters Patent is hereby corrected as shown below:

Column 9, line 25, delete "including" and substitute --having two reflectors, said reflectors comprising:--.

Signed and Sealed this

Fifteenth Day of May, 1990

*Attest:*

HARRY F. MANBECK, JR.

*Attesting Officer*     *Commissioner of Patents and Trademarks*